US009807536B2

(12) United States Patent
Liu et al.

(10) Patent No.: US 9,807,536 B2
(45) Date of Patent: Oct. 31, 2017

(54) METHOD AND SYSTEM FOR ACHIEVING SELF-ADAPTIVE SURROUND SOUND

(71) Applicant: Goertek, Inc., Weifang, ShanDong Province (CN)

(72) Inventors: Song Liu, Weifang (CN); Shasha Lou, Weifang (CN); Bo Li, Weifang (CN)

(73) Assignee: Goertek, Inc., Weifang, Shandong Province (CN)

( * ) Notice: Subject to any disclaimer, the term of this patent is extended or adjusted under 35 U.S.C. 154(b) by 0 days.

(21) Appl. No.: 14/896,175

(22) PCT Filed: Jun. 27, 2014

(86) PCT No.: PCT/CN2014/080961
§ 371 (c)(1),
(2) Date: Dec. 4, 2015

(87) PCT Pub. No.: WO2015/043264
PCT Pub. Date: Apr. 2, 2015

(65) Prior Publication Data
US 2016/0134986 A1    May 12, 2016

(30) Foreign Application Priority Data

Sep. 25, 2013  (CN) .......................... 2013 1 0441607

(51) Int. Cl.
*H04S 7/00* (2006.01)
*H04R 1/40* (2006.01)
(Continued)

(52) U.S. Cl.
CPC ................ *H04S 7/303* (2013.01); *G06T 7/50* (2017.01); *H04N 5/23212* (2013.01);
(Continued)

(58) Field of Classification Search
CPC .......... H04S 7/302; H04S 7/303; H04S 7/305; H04R 1/403; H04R 1/323; H04R 5/04;
(Continued)

(56) References Cited

U.S. PATENT DOCUMENTS

2006/0140420 A1* 6/2006 Machida ................ H04H 60/04
                                                    381/116
2011/0103620 A1* 5/2011 Strauss ..................... H04S 3/00
                                                    381/150

(Continued)

FOREIGN PATENT DOCUMENTS

| CN | 1981558 A | 6/2007 |
|----|-----------|--------|
| CN | 102860041 A | 1/2013 |
| JP | 2012-234431 | 11/2012 |

OTHER PUBLICATIONS

Chinese Application No. CN201310441607.9, First Officeton dated Feb. 16, 2016, 7 pages.

*Primary Examiner* — Vivian Chin
*Assistant Examiner* — Jason R Kurr
(74) *Attorney, Agent, or Firm* — Boyle Fredrickson, S.C.

(57) ABSTRACT

A method and a system for achieving a self-adaptive surround sound. The method comprises: recognizing specific positions of a room and a user in the room by using an object recognition technology, capturing focusing images of recognized objects by controlling a camera using a focusing control technology, and recording corresponding focusing parameters (S110); calculating position information of the room relative to the camera and position information of the user relative to the camera according to the images and the parameters (S120); calculating sound beams that can achieve the surround sound at the position of the user in said room according to aforesaid calculated position information of the room and the user (S130); obtaining parameters of a filter group according to the calculated sound beams, and
(Continued)

adjusting the filter group of a loudspeaker array according to the parameters (S140); and playing an audio signal via the loudspeaker array after the audio signal is filtered by the filter group that has been adjusted according to the parameters to form surround sound at the position of the user in the room (S150).

12 Claims, 7 Drawing Sheets

(51) Int. Cl.
　　　H04N 5/232　　　(2006.01)
　　　H04N 13/00　　　(2006.01)
　　　H04R 5/04　　　(2006.01)
　　　G06T 7/50　　　(2017.01)
　　　H04N 21/4223　　(2011.01)
　　　H04N 21/439　　　(2011.01)
(52) U.S. Cl.
　　　CPC ......... *H04N 13/0022* (2013.01); *H04R 1/403* (2013.01); *H04R 5/04* (2013.01); *G06T 2207/10028* (2013.01); *G06T 2207/10148* (2013.01); *G06T 2207/30201* (2013.01); *H04N 21/4223* (2013.01); *H04N 21/439* (2013.01); *H04R 2203/12* (2013.01)

(58) Field of Classification Search
　　　CPC ........ H04R 2203/12; H04R 3/12; G06T 7/70; G06T 7/74; G06T 7/571; G06T 2207/10028; G06T 2207/10148; G06T 7/50; G06T 2207/30201
　　　See application file for complete search history.

(56) References Cited

U.S. PATENT DOCUMENTS

| | | | |
|---|---|---|---|
| 2013/0083948 A1* | 4/2013 | Schmidt | H04R 5/02 381/303 |
| 2013/0121515 A1* | 5/2013 | Hooley | H04R 1/403 381/307 |
| 2016/0021481 A1* | 1/2016 | Johnson | H04R 3/12 381/303 |

* cited by examiner

METHOD AND SYSTEM FOR ACHIEVING SELF-ADAPTIVE SURROUND SOUND

TECHNICAL FIELD

The invention relates to the field of multimedia playing, particularly to a method and a system for achieving a self-adaptive surround sound.

BACKGROUND ART

With the development of multimedia technology, categories of multimedia devices enabling people to enjoy multimedia audio-visual functions are changing with each passing day. The present invention relates to a multimedia device that possesses a camera and a loudspeaker array and needs to achieve surround sound effect. For the sake of convenience, smart television is taken as an example to elaborate the invention here.

With the improvement of television manufacturing technology and display technology, household televisions become lighter and thinner and pictures are clearer and brighter. Correspondently, people have a higher requirement for audio player system.

Currently, smart television has possessed a light thin player system, for example, Soundbar, substituting the loudspeaker array for 5.1 player system which is of large volume and scattered arrangement. The loudspeaker array has a built-in digital signal processing chip which can accomplish sound processing. But one defect of the light thin loudspeaker array is insufficient surround sound effect. Existing solutions are Dipole stereo extension technology and beamforming technology, etc. Dipole has a relatively small listening area and has restriction for sitting position of users, thus it is difficult to create abundant surround sound in a larger area. And the beamforming technology can make full use of inner structure of the hall and array characteristics, so that the sound from the loudspeaker array can form a sound beam pointing to wall, thus abundant surround sound effect can be created in the entire hall using multiple reflections and scatterings by the wall.

However, prior technology that uses beamforming to create surround sound in the hall must have an acoustic calibration process in order to ensure that the sound beam indeed points to side wall and produces the reflection and surround effect. Therefore, the following problems are caused: First, manual calibration is needed before the loudspeaker array is used, thus the process is tedious. Second, additional calibration device is needed, such as measurement microphone, etc. Third, the listening position of users is limited to a narrower scope. If the users want to enjoy a favorable surround sound effect in other positions, the loudspeaker array needs to be calibrated again.

SUMMARY OF THE INVENTION

In view of aforesaid problem, the present invention provides a method and a system for achieving a self-adaptive surround sound to overcome aforesaid problem or at least partly solve aforesaid problem.

According to one aspect of the present invention, a method for achieving a self-adaptive surround sound is disclosed, and the method comprises:

recognizing specific positions of a room and a user in the room by using an object recognition technology, capturing focusing images of recognized objects by controlling a camera using a focusing control technology, and recording corresponding focusing parameters;

calculating position information of the room relative to the camera and calculating position information of the user relative to the camera according to the captured focusing images and the recorded corresponding focusing parameters;

calculating paths of sound beams that can achieve the surround sound at the position of the user in said room according to the calculated position information of the room relative to the camera and the position information of the user relative to the camera and the relative positional relation between the camera and a loudspeaker array;

determining parameters of a filter group of the loudspeaker array according to the calculated paths of the sound beams, and adjusting the filter group of the loudspeaker array using the parameters;

playing an audio signal via the loudspeaker array after the audio signal is filtered by the filter group that has been adjusted according to the parameters to form surround sound at the position of the user in the room.

According to another aspect of the invention, a system for achieving a self-adaptive surround sound is provided, and the system comprises: a camera, an object recognition and imaging unit, a position information acquiring unit, a sound beam control unit, and a loudspeaker array;

the camera configured to capture images;

the object recognition and imaging unit configured to recognize specific positions of a room and a user in the room by using an object recognition technology, capture focusing images of recognized objects by controlling the camera using a focusing control technology, and record corresponding focusing parameters;

the position information acquiring unit configured to calculate position information of the room relative to the camera and calculating position information of the user relative to the camera according to the captured focusing images and the recorded corresponding focusing parameters;

the sound beam control unit configured to calculate paths of sound beams that can achieve the surround sound at the position of the user in said room according to the calculated position information of the room relative to the camera, the position information of the user relative to the camera and the relative positional relation between the camera and the loudspeaker array; and determine parameters of a filter group of the loudspeaker array according to the calculated paths of sound beams, and adjust the filter group of the loudspeaker array using the parameters;

the loudspeaker array configured to play an audio signal after the audio signal is filtered by the filter group that has been adjusted according to the parameters to form surround sound at the position of the user in the room.

The present invention captures focusing images of specific positions of a room and a user by using object recognition and focusing control technology, and records the focusing parameters, and then calculates position information of the room relative to a camera and position information of the user relative to the camera, and calculates sound beams that can achieve surround sound at the position of the user according to the information, and determines parameters of a filter group of the loudspeaker array according to the calculated paths of the sound beams, and adjusts the filter group, and plays a sound signal via the loud speaker array after the sound signal is filtered by the filter group that has been adjusted according to the parameters, thus a self-adaptive surround sound is created at the position of the user in the objected room. The technical scheme of the invention can be free from an additional acoustic calibrating process and calibration device and does not need manual calibrating but can automatically calculate the orienting angle of the loudspeaker array sound beam that is suitable for the user, so that the user can experience abundant surround sound effect, and when the user moves to a new position, it can self-adaptively achieve a surround sound at the new position, not limiting the user's position and listening habit.

DETAILED DESCRIPTION OF THE EMBODIMENTS

The embodiments of the present disclosure are described in further detail with reference to the drawings below. Although the drawings show the embodiments of the present disclosure, it should be understood that the disclosure can be implemented in various forms and is not intended to be limited by the embodiments described here. On the contrary, the embodiments are provided to make the invention understood more thoroughly and to completely convey the scope of the disclosure to a person skilled in the art.

Figure 1:
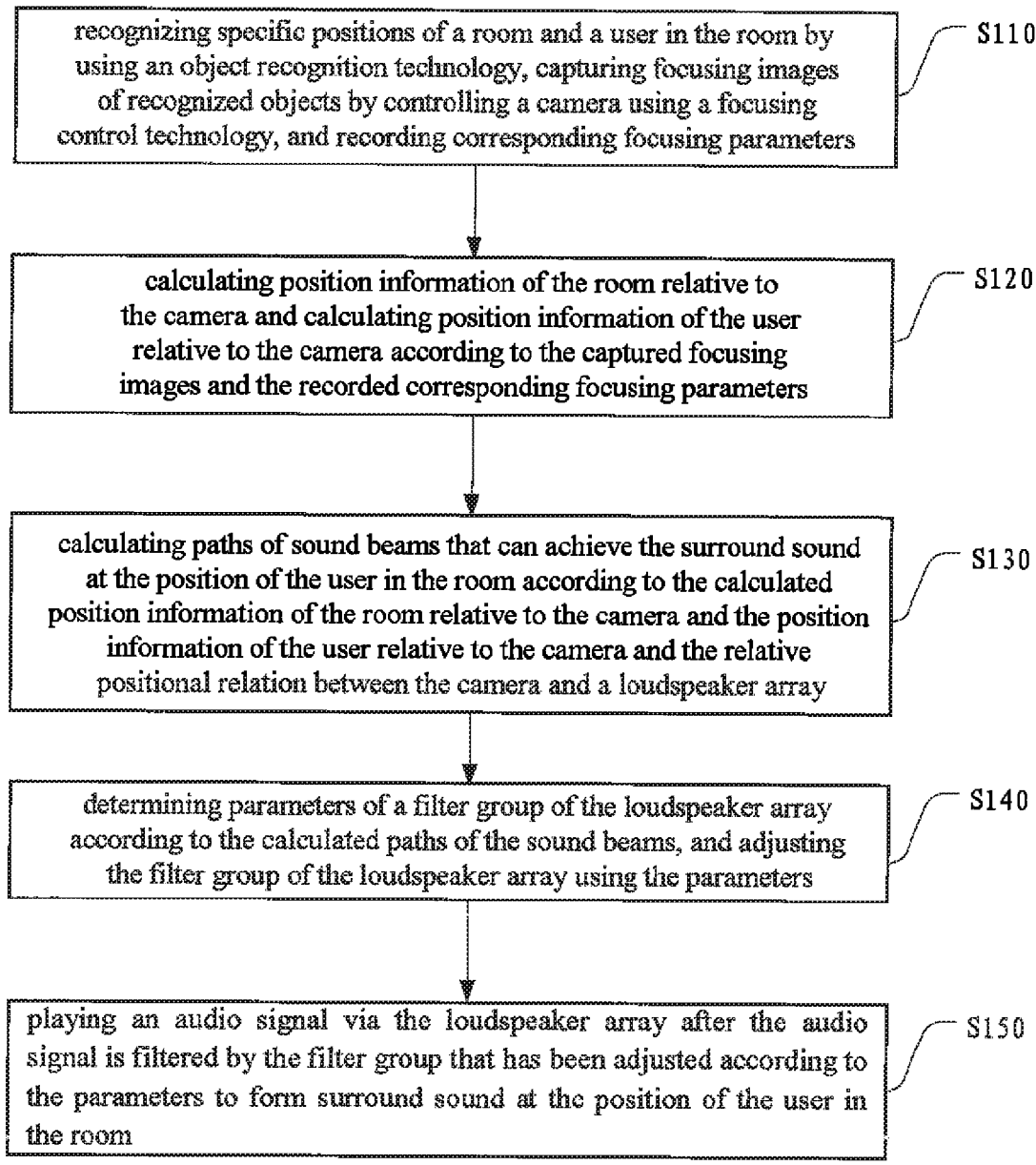
FIG. 1 is a flow chart of a method for achieving a self-adaptive surround sound of an embodiment of the invention.

FIG. 1 is a flow chart of a method for achieving a self-adaptive surround sound of an embodiment of the invention, and see FIG. 1, the method comprising:

Step S110, recognizing specific positions of a room and a user in the room by using an object recognition technology, controlling a camera to capture focusing images of recognized objects by using a focusing control technology, and recording corresponding focusing parameters.

Wherein the specific positions of the room are some positions in a room for determining the information like the room's size, orientation, etc. For example, four corners of the room, floor-wall boundaries that form the corners, midpoint on the floor-wall boundaries, and the like.

In an embodiment of the invention, floor-wall boundary recognition technology is used for recognizing corners and floor-wall boundaries, and focusing control technology is used for focusing on the corners and floor-wall boundaries and capturing the focusing images of the corners and floor-wall boundaries. In an embodiment of the invention, recognizing a user is specifically recognizing the face of the user, i.e. face recognition technology is used for recognizing the user's face, and focusing control technology is used for focusing on the user's face and capturing the focusing image of the user's face. The recorded focusing parameters comprise: focal length and image distance for capturing the focusing images. In other embodiments of the invention, other feasible technologies can be adopted to recognize the user, too.

That is, floor-wall boundary recognition technology is used for recognizing the left corner, the right corner, the midpoint on the left floor-wall boundary, and the midpoint on the right floor-wall boundary, wherein the midpoints on the boundaries are midpoints on the part of the boundaries that appear in the focusing images; face recognition technology is used for recognizing the user's face in the room; after the objects are recognized, calculating the area where the objects are located, and the camera can precisely focus on the recognized objects and form clear images according to the calculating result. There are various ways of achieving precise focusing and clear imaging. Depending on the type of camera, it can be drive focusing motor of ordinary camera, or light field reestablishment of light field camera. In the description of the scheme of the invention, drive focusing motor is taken as an example to describe the way of precisely focusing on the object and forming clear images.

In the embodiments of the invention, only single user's facial focusing image is captured. If there are multiple people in the room, the person closest to the center of the room is taken as the user whose facial focusing image is captured.

Step S120, calculating position information of the room relative to the camera and calculating position information of the user relative to the camera according to the captured focusing images and the recorded corresponding focusing parameters.

The camera can be a passive focusing camera, an active focusing camera, or a camera with depth perception.

In the step: calculating object distances of the left corner, the right corner, the midpoint on the left floor-wall boundary, and the midpoint on the right floor-wall boundary from the camera respectively and the angles of the left corner, the right corner, the midpoint on the left floor-wall boundary, and the midpoint on the right floor-wall boundary relative to the central axis of the camera lens, and calculating equation of the left floor-wall boundary, equation of the right floor-wall boundary and equation of the opposite floor-wall boundary; and calculating the object distance of the user from the camera and angle of the user relative to the central axis of the camera lens.

In an embodiment of the invention, according to the recorded focal length and image distance when capturing focusing image of the user's face, the object distance of the user from the camera is obtained based on conjugate imaging principle; according to the position of the user's face in the focusing image in combination with a visual angle parameter of the camera lens, the angle of the user relative to the central axis of the camera lens is determined; similarly, the object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to the central axis of the camera lens are obtained respectively; the equation of the left floor-wall boundary is obtained according to the coordinate information of the left corner and the midpoint on the left floor-wall boundary and based on the principle of two points defining a straight line; the equation of the right floor-wall boundary is obtained according to the coordinate information of the right corner and the midpoint on the right floor-wall boundary and based on the principle of two points defining a straight line. Here the position information of the room relative to the camera can be determined according to the coordinate of the left corner and the right corner and the equations of the left floor-wall boundary and the right floor-wall boundary.

Step S130, calculating the paths of sound beams that can achieve the surround sound at the position of the user in the room according to the calculated position information of the room relative to the camera and the position information of the user relative to the camera and relative positional relation between the camera and the loudspeaker array.

Step S140, determining parameters of the filter group of the loudspeaker array according to the calculated paths of the sound beams, and adjusting the filter group of the loudspeaker array using the parameters.

That is, after the orienting angle of the sound beam is obtained by calculation, calculate the filter group of the loudspeaker array.

Step S150, playing an audio signal via the loudspeaker array after the audio signal is filtered by the filter group that has been adjusted according to the parameters to form surround sound at the position of the user in the room.

The method shown in FIG. 1 can self-adaptively create a surround sound at the position of the user in the objected room. And the method does not need manual calibration and, for smart television, does not need an additional hardware. And when the user moves to another position, it can timely and self-adaptively achieve a surround sound at the position after moving.

Figure 2:
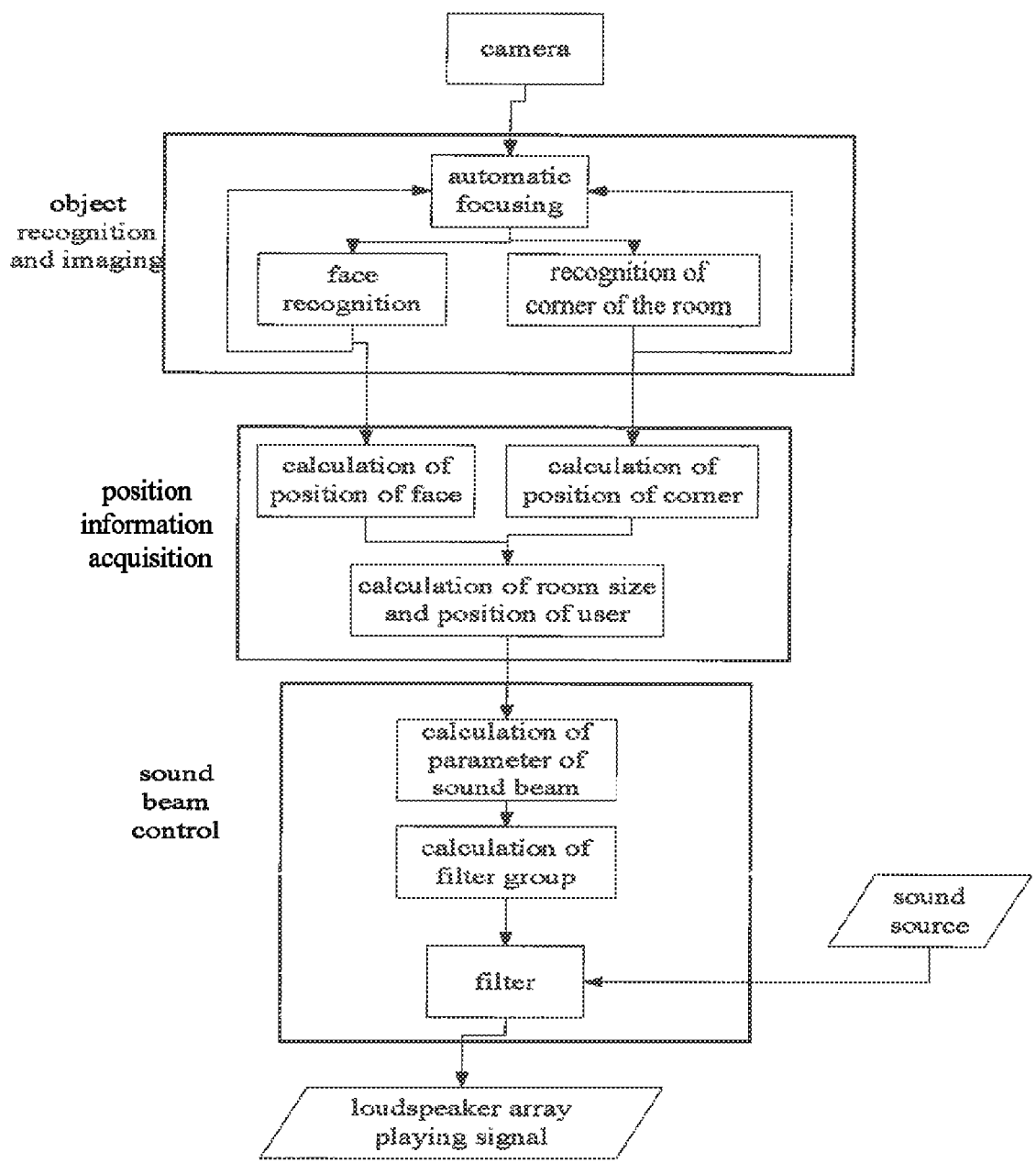
FIG. 2 is a schematic diagram of the principle of a method for achieving a self-adaptive surround sound of an embodiment of the invention.

FIG. 2 is a schematic diagram of the principle of a method for achieving a self-adaptive surround sound of an embodiment of the invention. As is shown in FIG. 2, the method of the embodiment comprises three steps:

First step, object recognition and imaging: the function of the step is recognizing specific positions of a room (i.e. the left and right corner and the midpoints of the left and right floor-wall boundaries of an embodiment of the invention) and a user's face by using object recognition technology, that is, by using floor-wall boundary recognition technology and face recognition technology respectively, and controlling a camera to automatically focus and capture the focusing images of corresponding objects, and meanwhile recording the focusing parameters for capturing the focusing images.

Second step, position information acquiring: the position information acquiring comprises calculation of position information of the user relative to the loudspeaker array and calculation of position information of the room relative to the loudspeaker array.

Third step, sound beam control: according to the relevant data calculated in the second step, calculate the paths of a sound beams that can achieve the surround sound at the position of the user in the room. Calculate parameters of the filter group according to the calculated paths of the sound beams. After filtering, the sound source signal is played via the loudspeaker array to form a surround sound. For each loudspeaker unit, the sound source of left channel is superposed after being filtered by the left sound beam filter group, and the sound source of right channel is superposed after being filtered by the right sound beam filter group, and then the sound is played via the loudspeaker unit after joint superposition.

The reason for distinguishing left and right sound beam filter group is because, for each unit, the two sound beams of left channel are left sound source being filtered by two filters which are left sound beam 1 filter and left sound beam 2 filter, and the sound beams of right channel are right sound source being filtered by two filters which are right sound beam 1 filter and right sound beam 2 filter. Each filter has independent meaning and different weight, and should be handled separately. And left sound source and right sound source are also different, thus the left and right filter group should be distinguished.

Figure 3:
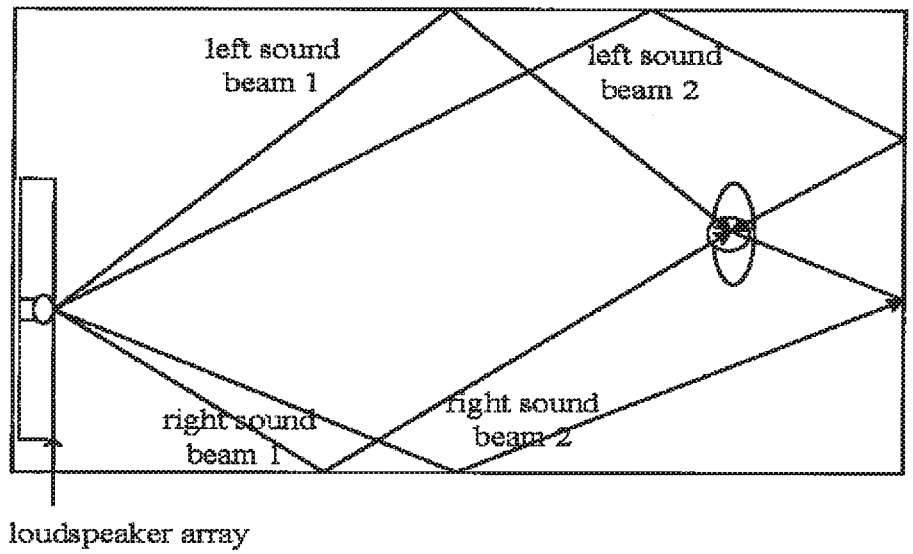
FIG. 3 is a schematic diagram of the paths of the sound beams for achieving a surround sound of an embodiment of the invention.

FIG. 3 is a schematic diagram of the paths of the sound beams for achieving a surround sound of an embodiment of the invention. In the embodiment of the invention, the sound beam that can achieve surround sound at the position of the user in the room refers to: the sound beam among various sound beams from the sound source reaching the position of the user after one reflection or two reflection by the wall. Specifically, for the paths of the sound beams that can achieve surround sound at the position of the user in the room, as is shown in FIG. 3, the sound source of left channel forms two sound beams which are reflected once and twice by the wall respectively and then reach the user. The right channel is the same. That is, the sound beams that can achieve surround sound at the position of the user in the room in the embodiment comprise: left sound beam 1, left sound beam 2, right sound beam 1, and right sound beam 2, wherein:

the left sound beam 1 is a sound beam that is pointed towards the left wall and is reflected once by the left wall, then reaching the position of the user;

the left sound beam 2 is a sound beam that is pointed towards the left wall and is reflected once by the left wall, and then reflected once by the opposite wall, then reaching the position of the user;

the right sound beam 1 is a sound beam that is pointed towards the right wall and is reflected once by the right wall, then reaching the position of the user;

the right sound beam 2 is a sound beam that is pointed towards the right wall and is reflected once by the right wall, and then reflected once by the opposite wall, then reaching the position of the user.

Wherein the opposite wall refers to the wall opposite to the loudspeaker array and the camera, i.e. the wall parallel to the wall where the loudspeaker array and the camera are located.

Aforesaid process will be described in further detail below. What should be declared in advance here is that: positions of the camera and the loudspeaker array of a smart television are relatively fixed. For example, a common form is that the camera is generally located at the center on the top of a television, while the loudspeaker array is located on the bottom of the television, and the camera and the loudspeaker array generally lie on the same vertical line. In subsequent embodiments, the present invention, based on this form, believes that the focal plane of the camera is parallel to the loudspeaker array and is vertical to the floor, and that the line between the camera center and the loudspeaker array center is vertical to the floor. That is, the horizontal angle position of each object relative to the camera is same with the horizontal angle position of each object relative to the loudspeaker array. However, the method of the invention is not limited to such arrangement. If the camera is not located at the center of the loudspeaker array or the focal plane of the camera is not parallel to the loudspeaker array but forms an included angle, the method of the invention is still applicable, only corresponding geometric coordinate shift needs to be added to the sound beam angle.

1. Object Recognition and Focusing Imaging

Figure 4:
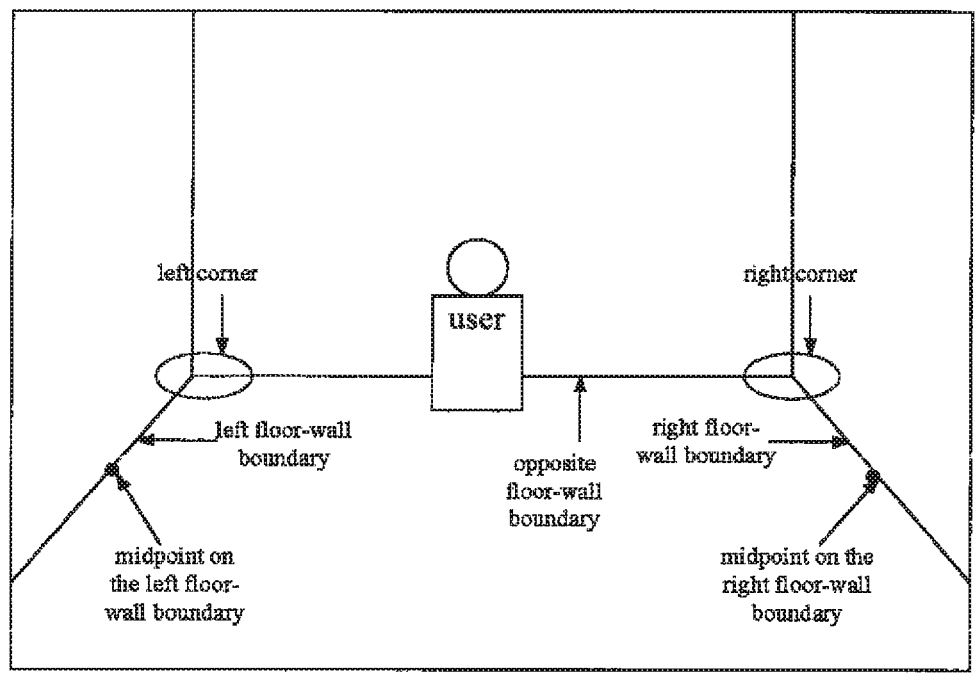
FIG. 4 is a schematic diagram of the position of an object to be recognized in a photo shot by a camera of an embodiment of the invention.

FIG. 4 is a schematic diagram of the position of an object to be recognized in a photo shot by a camera of an embodiment of the invention. See FIG. 4, in the embodiment of the invention, the objects to be recognized comprising: left corner of the room, right corner of the room, left floor-wall boundary, right floor-wall boundary, and user's face. After the objects are recognized, the automatic focusing control device will calculate the area where the objects are located and drive the focusing motor according to the calculating result, so that the camera can be focused precisely on the objects and form clear images.

The floor-wall boundary recognition technology is adopted to recognize corners and floor-wall boundaries, and the face recognition technology is adopted to recognize the user's face.

The focusing control technology is adopted to control the camera to be focused precisely on various objects including specific positions in the room (such as left and right corners of the room, midpoints of left and right floor-wall boundaries) and the user's face, and to capture the focusing images of aforesaid left and right corners, left and right floor-wall boundaries and the user's face, recording the focusing parameters while focusing imaging for subsequent calculation of the position of the room relative to the camera and the position of the user in the room relative to the camera.

2. Position Information Acquiring

According to the captured focusing images and the recorded corresponding focusing parameters, calculating the position information of the room relative to the camera and the position information of the user relative to the camera, the separate description is as follows:

2.1 Calculation of Position Information of the User Relative to the Camera

According to the captured focusing images and the recorded corresponding focusing parameters, the distance between the user and the lens plane of the camera and the angle coordinate of the user relative to the central axis of the camera can be calculated.

2.1.1 Calculation of the Distance Between the User and the Camera

The object distance of the user from the camera can be obtained according to the recorded focal length and image distance when the focusing image of the user's face is captured and based on the conjugate imaging principle.

Figure 5:
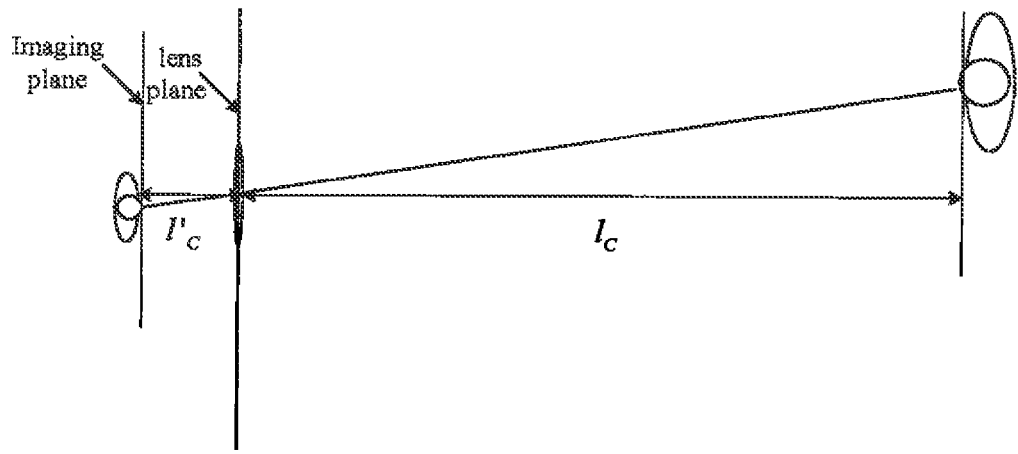
FIG. 5 is a schematic diagram of the distance relation between a user and a camera lens of an embodiment of the invention.

If the camera is an active focusing camera, it will perform distance measurement before focusing, such as infrared distance measurement, fill light distance measurement or supersonic distance measurement, etc., so the distance between the user and the camera lens can be directly obtained by measurement without additional calculation. In addition, for some camera with depth perception, such as camera with multiple lenses or 3D camera, the object distance can be directly determined by visual angle difference, and the like. For passive focusing camera, the object distance can be calculated by calculation. Refer to FIG. 5 for the computation mode.

FIG. 5 is a schematic diagram of the distance relation between a user and a camera lens of an embodiment of the invention. As is shown in FIG. 5, set the distance between the user and the lens plane to $l_C$, i.e. object distance, and during precise focusing and imaging, the distance between the imaging plane and the lens plane is $l'_C$ i.e. image distance, and focal length of the lens is f which is an intrinsic parameter of lenses, and $l'_C$ is known when precise focusing. Then the distance between the user and the lens plane $l_C$ can be obtained by calculation according to formula of conjugate imaging principle as follow:

$$l_C = \frac{1}{\frac{1}{f} - \frac{1}{l'_C}}$$

2.1.2 Calculation of Angle Coordinates of the User

According to the position of the user's face in the focusing imaging, in combination with the visual angle parameter of the camera lens, the angle of the user relative to the central axis of the camera lens can be determined.

Figure 6:
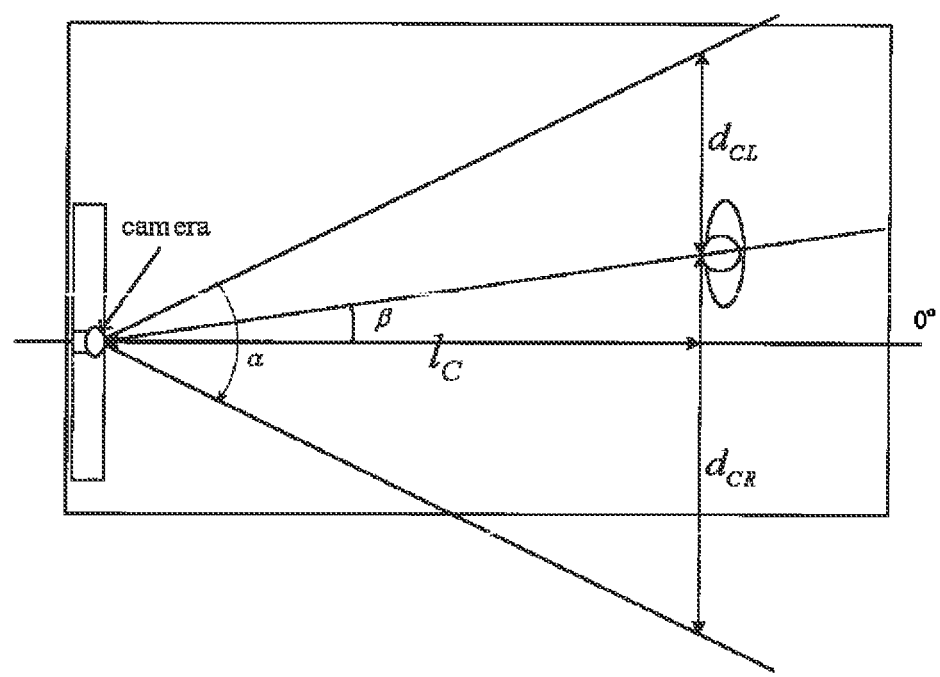
FIG. 6 is a schematic diagram of the angle relation between a user and a camera lens of an embodiment of the invention.

FIG. 6 is a schematic diagram of the angle relation between a user and a camera lens of an embodiment of the invention. As is shown in FIG. 6, after the clear picture precisely in focus is obtained, position of the user's face in the picture can be obtained by using picture processing technologies such as face recognition and contour acquiring, and in combination with the visual angle parameter of the lens, the angle, i.e. angle coordinates, of the user relative to the central axis of the lens can be determined.

In the focusing image of the user's face, set the distance from the center of the user's face to the left margin of the picture to $d_{CL}$ and to the right margin to $d_{CR}$, and the visual angle of the lens to $\alpha$, taking the angle of the direction of the central axis of the lens as 0°. The angle of the user's face relative to the central axis of the lens is $\beta$, and the distance, i.e. object distance, between the user and the television is $l_C$. Then according to trigonometric function, when other parameters are known, the angle coordinates of the user's face can be calculated:

$$\tan\frac{\alpha}{2} = \frac{(d_{CL} + d_{CR})/2}{l_C}$$

and $$\tan\beta = \frac{(d_{CR} - d_{CL})/2}{l_C}$$

then $$\beta = \arctan\left(\frac{(d_{CR} - d_{CL})\tan\frac{\alpha}{2}}{d_{CR} + d_{CL}}\right)$$

can be obtained.

2.2 Calculation of Position Information of the Room Relative to the Camera

Similar to the calculation of position information of the user relative to the camera in section 2.1, the object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to the central axis of the camera lens can be obtained, respectively; the equation of the left floor-wall boundary is obtained according to the coordinate information of the left corner and the midpoint on the left floor-wall boundary and based on the principle of two points defining a straight line; and the equation of the right floor-wall boundary is obtained according to the coordinate information of the right corner and the midpoint on the right floor-wall boundary and based on the principle of two points defining a straight line.

The focusing images and corresponding focusing parameters obtained by the floor-wall boundary recognition technology and focusing control technology are used for calculating the distances from the lens to the right and left corner and the midpoints on the left and right floor-wall boundaries and angle coordinates. In other embodiments of the invention, the included angle of the floor-wall boundary relative to the central axis of the camera lens can also be calculated. As is shown in FIG. 4, the midpoint on the floor-wall boundary refers to the midpoint on the part of the floor-wall boundary that appears in the focusing image. The part appearing in the focusing image refers to the visible floor-wall boundary in the focusing image (i.e. photo that is shot) shown in FIG. 4.

What should be explained here is that: the midpoint on floor-wall boundary is not necessary for defining the equation of the floor-wall boundary. The corner and any point on the floor-wall boundary can define the equation of the floor-wall boundary. Choosing the midpoint of the floor-wall boundary in the embodiment is for the purpose of avoiding deformation and vagueness of the margin of the photos. The specific method is that: taking the left floor-wall boundary as an example, the coordinate of the left corner on the photo is known, and the left floor-wall boundary (possibly not a complete floor-wall boundary but a part) is detected, thus the distance between the midpoint of the left floor-wall boundary and the left margin of the photo is exactly half of the distance between the left corner and the left margin, and on the left floor-wall boundary. In this way the coordinate position can be calculated, then precisely focusing.

Figure 7:
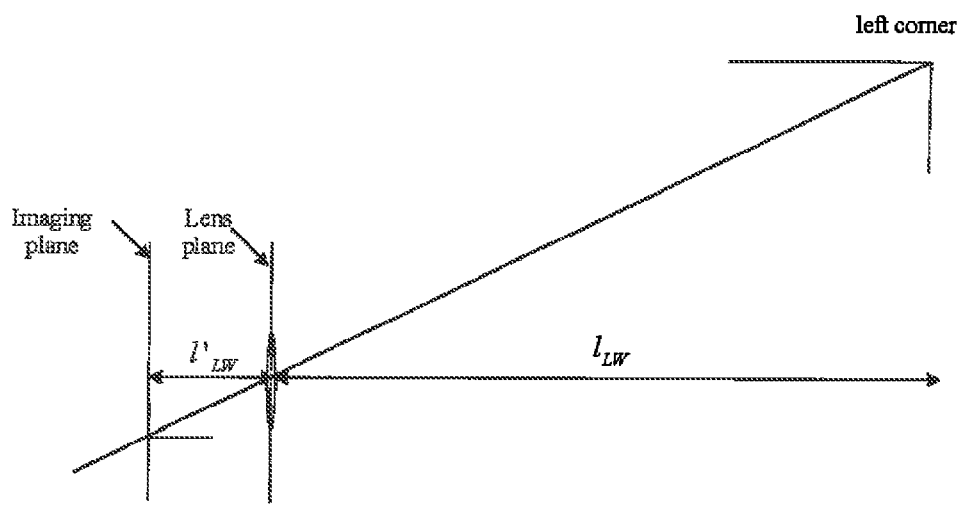
FIG. 7 is a schematic diagram of the distance relation between the left corner and a camera lens of an embodiment of the invention.

FIG. 7 is a schematic diagram of the distance relation between the left corner and a camera lens of an embodiment of the invention. As is shown in FIG. 7, taking the left corner and the midpoint on the left floor-wall boundary as an example, set the distance between the left corner and the lens plane to $l_{LW}$, and when precise focusing and imaging, the distance between the imaging plane and the lens plane is $l'_{LW}$, i.e. image distance, and focal length of the lens is f which is an intrinsic parameter of lenses. Then the distance between the left corner and the lens plane can be calculated according to conjugate imaging:

$$l_{LW} = \frac{1}{\frac{1}{f} - \frac{1}{l'_{LW}}}$$

Figure 8:
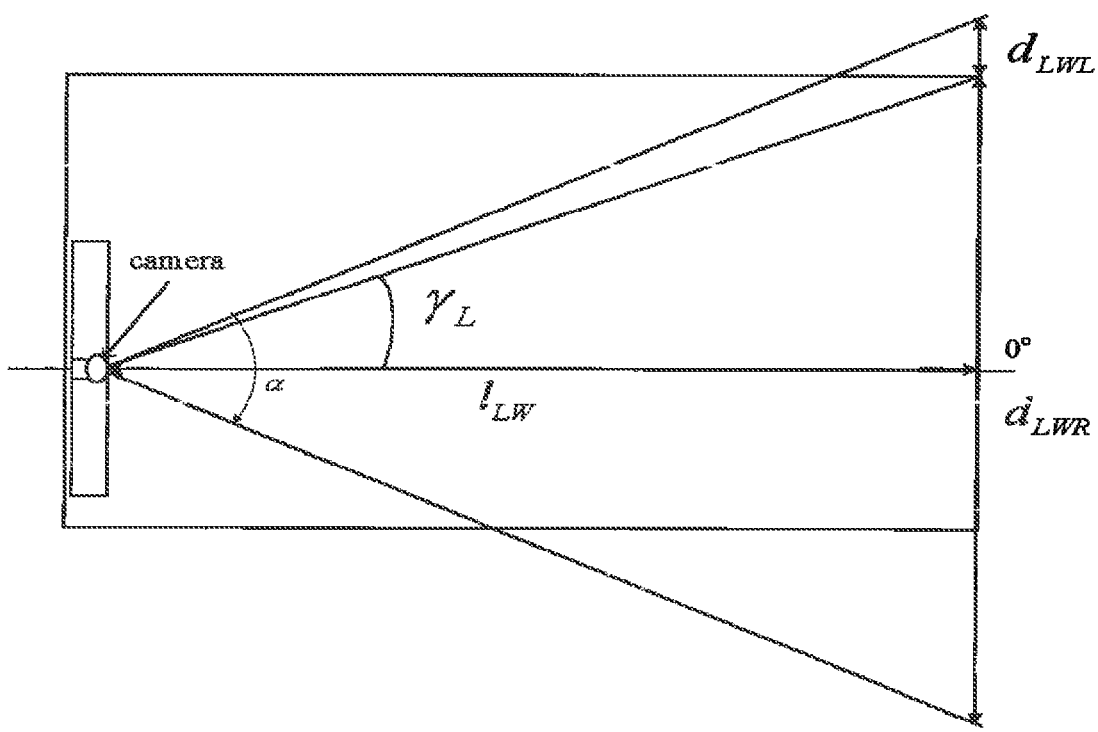
FIG. 8 is a schematic diagram of the angle relation between the left corner and a camera lens of an embodiment of the invention.

After obtaining the clear picture which is in precise focus and recognizing the corner, the angle coordinate of the left corner can be calculated by using lens parameters. FIG. 8 is a schematic diagram of the angle relation between the left corner and a camera lens of an embodiment of the invention.

As is shown in FIG. 8, set in the focusing image of the left corner the distance from the left corner to the left margin to $d_{LWL}$ and to the right margin to $d_{LWR}$, and the visual angle of the lens is α, taking the angle of the direction of the central axis of the lens as 0°. The angle of the left corner relative to the central axis of the lens is $\gamma_L$, thus $$\gamma_L = \arctan\left(\frac{(d_{LWR} - d_{LWL})\tan\frac{\alpha}{2}}{d_{LWR} + d_{LWL}}\right)$$

can be calculated.

In a rectangular plane coordinate system with the position of the camera as zero point and the central axis of the camera as x axis, the rectangular plane coordinate of the left corner is $(l_{LW}, l_{LW} \tan \gamma_L)$. Similarly, the distance and angle of the midpoint on the left floor-wall boundary relative to the lens can be obtained. Set the distance and angle to $l_{LWM}$ and $\gamma_{LM}$ respectively, then the rectangular plane coordinate of the midpoint on the left floor-wall boundary is $(l_{LWM}, l_{LWM} \tan \gamma_{LM})$, and then according to the principle of two points defining a straight line, the equation of the left floor-wall boundary can be obtained: y=kx+c Wherein, $$k = \frac{l_{LW}\tan\gamma_L - l_{LWM}\tan\gamma_{LM}}{l_{LW} - l_{LWM}}$$

$$c = \frac{l_{LW}\tan\gamma_L l_{LWM} - l_{LWM}\tan\gamma_{LM} l_{LW}}{l_{LW} - l_{LWM}}$$

Similarly, the equation of the right corner and right floor-wall boundary can be calculated.

In the embodiment, the specific position information of the room relative to the camera is: the coordinates of the left and right corners and the equations of the left and right floor-wall boundaries, wherein the coordinate system adopted is a rectangular coordinate system with the camera as the zero point, the central axis of the camera lens as the x axis, and the plane defined by x axis and y axis parallel to horizontal plane, which is called reference coordinate in the embodiment.

3. Sound Beam Control 3.1 Calculation of Paths of Sound Beams

In an embodiment of the invention, preferable sound beams that can achieve the surround sound at the position of the user in the room comprises: left sound beam 1, left sound beam 2, right sound beam 1 and right sound beam 2 as is shown in FIG. 3.

The paths of the sound beams that can achieve the surround sound at the position of the user in the room needs to be calculated according to the calculated position information of the room relative to the camera, the position information of the user relative to the camera, and the relative positional relation between the camera and the loudspeaker array. In an embodiment of the invention, the camera is generally placed at the central position of the television and is close to the central position of the loudspeaker array, and the lens plane of the camera is generally parallel to the plane of the array element of the loudspeaker array, thus the position measured by the camera can be the basis of calculation of sound beam direction. The position of the left sound beam can be calculated by the principle of sound transmission. In the embodiment, the camera and the loudspeaker array lie on the same vertical line, thus the camera and the loudspeaker array are regarded at the same position in aforesaid coordinate system, that is, the position of each object relative to the camera and the position of each object relative to the loudspeaker array are the same.

3.1.1 Calculation of Equation of Left Sound Beam 1

In foresaid reference coordinate, the position of the camera is zero point, and the mirror image point of the position of the user relative to the left floor-wall boundary is obtained; the equation of the left sound beam 1 is obtained according to the coordinates of zero point and the mirror image point and on the basis of the principle of two point defining a straight line, specifically:

the equation of the left floor-wall boundary can be obtained according to the calculation in 2.2: $y=kx+c$;

Set the coordinate of the user in the reference coordinate system to $(a,b)$, and the mirror image point of the user relative to the left floor-wall boundary is $(a_1,b_1)$, then the perpendicular bisector of the line between $(a,b)$ and $(a_1,b_1)$ is the equation of the left floor-wall boundary.

Thus the left sound beam 1 passes the zero point and the user mirror image point $(a_1,b_1)$, and the equation of the left sound beam is:

$$y = \frac{b_1}{a_1}x$$

As is known from the equation of the mirror image relation:

$$a_1 = \frac{2kb + (1-k^2)a - 2kc}{k^2+1}$$

$$b_1 = b\frac{k^2-1}{k^2+1} + \frac{2a}{k(k^2+1)} + \frac{2c}{k^2+1}$$

3.1.2 Calculation of Equation of Left Sound Beam 2

Figure 9:
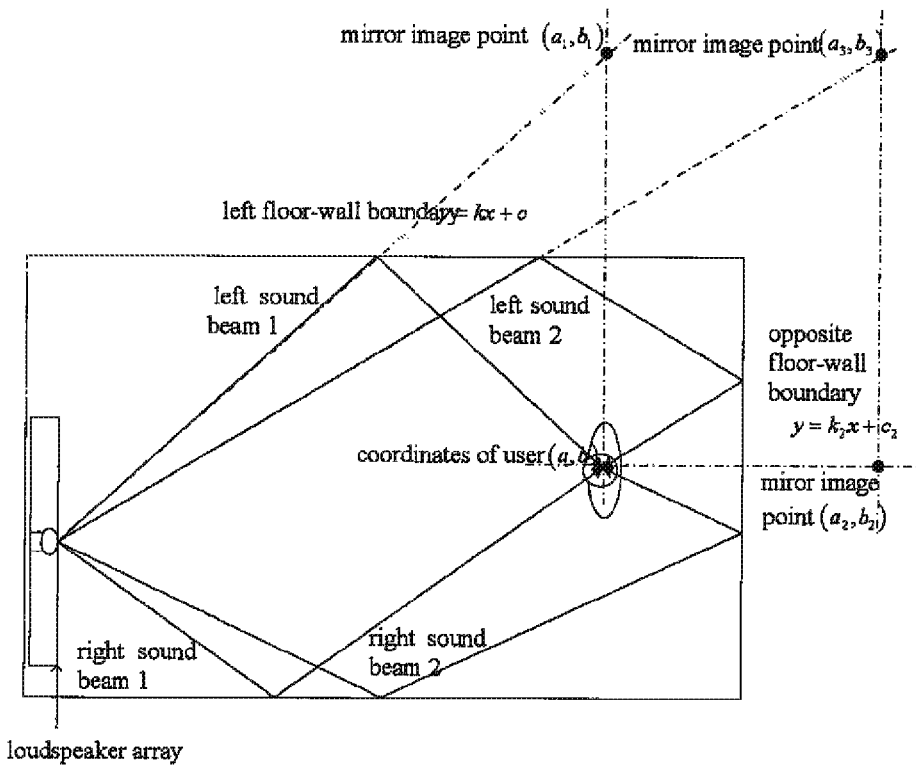
FIG. 9 is a schematic diagram of calculating the paths of the sound beams of an embodiment of the invention.

The calculation method of the left sound beam 2 is similar to the method in 3.1.1, only two reflection needs to be calculated. The zero point is the position of the camera, and the mirror image point 1 of the position of the user relative to the opposite floor-wall boundary is obtained, and the mirror image point 2 of the mirror image point 1 relative to the left floor-wall boundary is obtained according to the mirror image point 1, and the equation of the left sound beam 2 is obtained according to the coordinates of zero point and mirror image point 2 and on the basis of two points defining a straight line, specifically:

Suppose the equation of the floor-wall boundary of the wall opposite to the camera (opposite floor-wall boundary herein) is: $y=k_2x+c_2$;

The definition of left floor-wall boundary and user is as previously mentioned. Set the mirror image point of the user relative to the opposite floor-wall boundary to $(a_2,b_2)$, and the mirror image point of $(a_2,b_2)$ relative to the left floor-wall boundary is $(a_3,b_3)$, as is shown in FIG. 9. FIG. 9 is a schematic diagram of calculating the paths of the sound beams of an embodiment of the invention, thus the equation of the left sound beam 2 is:

$$y = \frac{b_3}{a_3}x$$

$(a_2,b_2)$ is the mirror image point of $(a,b)$ relative to the opposite floor-wall boundary $y=k_2x+c_2$, that is, the distances from any point on $y=k_2x+c_2$ to $(a_2,b_2)$ and $(a,b)$ are the same, thus from the equation of mirror image relation, the relational expression can be obtained:

$$a_2 = \frac{2k_2b + (1-k_2^2)a - 2k_2c_2}{k_2^2+1}$$

$$b_2 = b\frac{k_2^2-1}{k_2^2+1} + \frac{2a}{k_2(k_2^2+1)} + \frac{2c_2}{k_2^2+1}$$

Similarly, $(a_3,b_3)$ is the mirror image point of $(a_2,b_2)$ relative to the left floor-wall boundary $y=kx+c$, then according to the equation of the mirror image relation obtaining:

$$a_3 = \frac{2kb_2 + (1-k^2)a_2 - 2kc}{k^2+1}$$

$$b_3 = b_2\frac{k^2-1}{k^2+1} + \frac{2a_2}{k(k^2+1)} + \frac{2c}{k^2+1}$$

Thus, when the position of the left floor-wall boundary, position of the opposite floor-wall boundary, and position of the user are known, the equation of the left sound beam 2 can be obtained.

Similarly, the equations of right sound beam 1 and right sound beam 2 can be obtained.

In other embodiments of the invention, if the camera and the loudspeaker have relative position difference (i.e. they are located at different points in the reference coordinate system), the position information of the room relative to the camera and position information of the user relative to the camera need to be converted into position information of the room relative to the loudspeaker array and position information of the user relative to the loudspeaker array according to the relative positional relation of camera and loudspeaker array; and then establish a coordinate system with the position of the loudspeaker array as the zero point, obtaining the mirror image point of the position of the user relative to the left floor-wall boundary in the coordinate system; obtain the equation of the left sound beam 1 according to the coordinates of zero point and the mirror image point and on the basis of the principle of two points defining a straight line. Establish a coordinate system with the position of the loudspeaker array as the zero point, obtaining the mirror image point of the position of the user relative to the opposite floor-wall boundary in the coordinate system. According to the mirror image point of the user relative to the opposite floor-wall boundary, a mirror image point of this mirror image point relative to the left floor-wall boundary can be obtained, and according to the principle of two points defining a straight line the equation of the left sound beam 2 can be obtained. Similarly, the equations of the right sound beam 1 and right sound beam 2 can be obtained.

3.2 Abnormal Condition Handling

Some abnormal conditions might appear in actual use. For example, position of the corner cannot be completely detected, or television and loudspeaker array are placed in corner or unparallel to the wall in the room, or sound beam might be blocked by the user. Calculation of sound beam will have some change.

Figure 10:
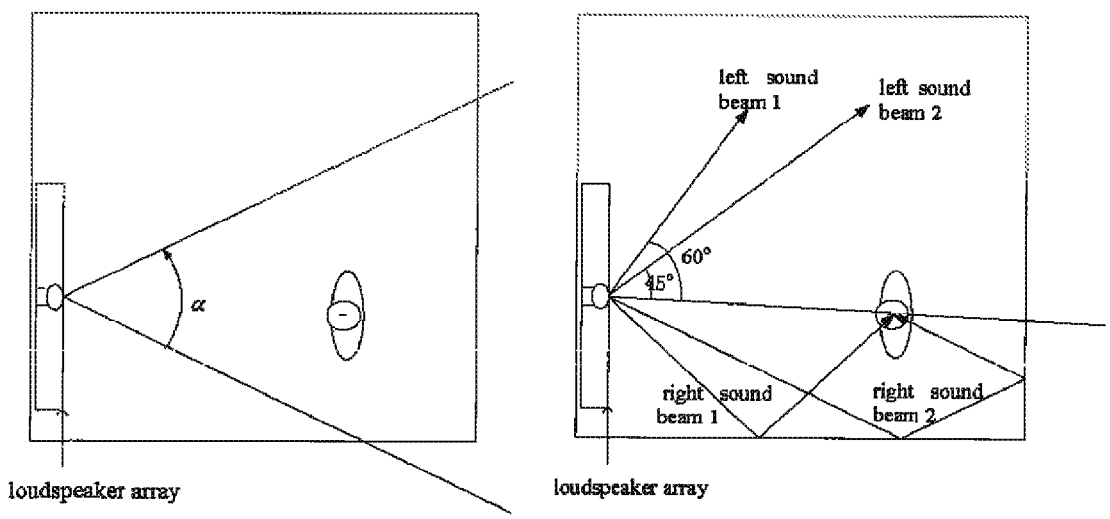
FIG. 10 is a schematic diagram showing that a corner on one side of the wall cannot be detected of an embodiment of the invention.

FIG. 10 is a schematic diagram showing that a corner on one side of the wall cannot be detected of an embodiment of the invention. When the position of a corner on one side cannot be detected and the position of corresponding wall cannot be calculated, as is shown in FIG. 10, the directions of the two sound beams on this side deflect certain angles from the user, for example, which can be set to 60° and 45° according to empirical value, as default angles of the two sound beams on this side. That is, when the images of the left corner and/or right corner cannot be captured, make the directions of the two sound beams on the corresponding side deflect certain angles from the user. If the left floor-wall boundary does not appear in the camera, the angle of the left sound beam 1 is the azimuth angle of the user plus 60°, while the angle of left sound beam 2 is the azimuth angle of the user plus 45°. The right side is similar.

Under default angle, the reflection point of one reflection of the sound beam is on the side wall, which is related to the visual angle of the lens. If the lens does not shoot a corner, the angle of the line between the corner and the center of the lens (relative to the central axis of the camera lens) must be larger than the visual angle, while the visual angle of camera can usually cover over half of the width of the opposite wall. The visual angle scope of common smart television camera does not exceed plus or minus 45°, usually in the scope of plus or minus 30°, thus there is a great possibility the reflection point of one reflection is on the side wall if the default angle is set to no less than 45°. There are other methods or other values to set the default angle. If the visual angle of the camera is larger, the default angle will be larger correspondingly. If the visual angle of the camera is smaller, the default angle will be reduced correspondently.

Figure 11:
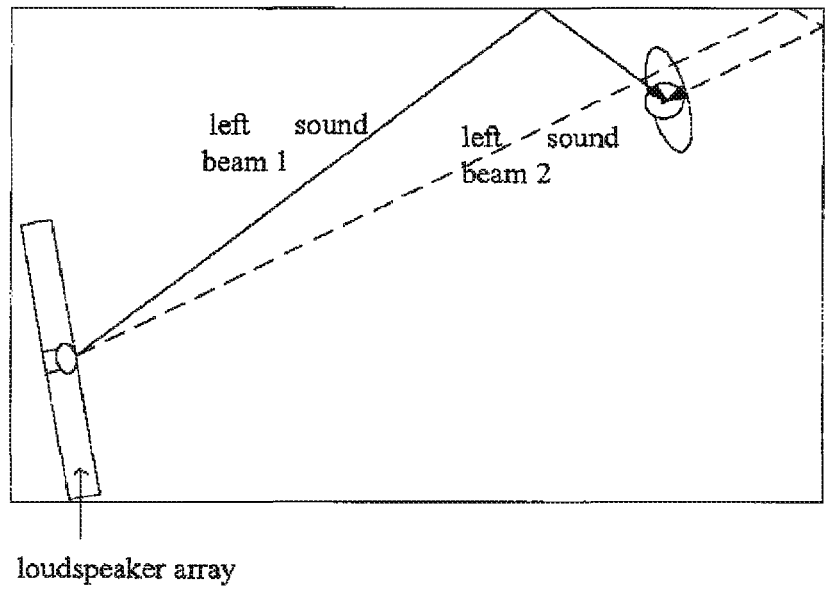
FIG. 11 is a schematic diagram showing that the sound beam might be blocked by a user of an embodiment of the invention.

FIG. 11 is a schematic diagram showing that the sound beam in abnormal condition might be blocked by a user of an embodiment of the invention. When the sound beam might be blocked by the user, as is shown in FIG. 11 where the left sound beam 2 is blocked by the user, on this occasion, the left sound beam 2 at this direction should be canceled. Similarly, when any of aforesaid left sound beam 1, left sound beam 2, right sound beam 1, and right sound beam 2 is blocked by the user, the sound beam should be canceled.

What should be explained is that the sound beam need not be canceled if it is blocked by anything other than the user. The sound beam is canceled only when it is blocked by the user.

3.3 Calculation of Filter Group Parameters

According to the calculated paths of the sound beams, the parameters of the filter group of the loudspeaker array can be determined, and the parameters can be used for adjusting the filter group of the loudspeaker array.

After the paths of the sound beams are calculated, the orienting angle of the sound beam relative to the loudspeaker array can be known, and the filter group of the loudspeaker array can be calculated. If the frequency response of each unit of the loudspeaker array is:

$R(\theta,f)=[R_1(\theta,f) R_2(\theta,f) \ldots R_M(\theta,f)];$ wherein f is frequency; θ is angle; $R_i$ is frequency-response function of i-th array element;

The filter group is:

$H_{L1}(\theta,f)=[H_{L11}(\theta,f) H_{L12}(\theta,f) \ldots H_{L1M}(\theta,f)];$ wherein $H_{L1i}$ is frequency-response function of i-th filter.

Position of the array element can calculate the filter group according to the ordinary theorem of sound beam formation. The common arithmetic is Minimum Variance Distortionless Response (MVDR) or Delay-And-Sum, and the like.

Taking MVDR as an example, the calculation of the filter group is as follows:

Set the angle of sound beam to $\theta_{L1}$, then the optimal orientation of the sound beam is that all radiation energy is focused on $\theta_{L1}$, thus other area is 0. That is, the response function of ideal sound beam is:

$$D_{L1opt}(\theta, f) = \begin{cases} 1 & \theta = \theta_{L1} \\ 0 & \theta \neq \theta_{L1} \end{cases}$$

The sound beam that can actually be formed is $D_{L1}(\theta,f)$, which should be close to ideal sound beam $D_{L1opt}(\theta,f)$ as much as possible.

The equation of the actual sound beam is:

$D_{L1}(\theta,f)=H_{L1}(f)R(\theta,f)^T$

Wherein $*^T$ means vector quantity doing transpose operation.

Thus when being closest to the ideal sound beam, there is $$H_{L1}(f) = \operatorname{argmin} \frac{\partial \left[ \int_\theta |D_{L1}(\theta, f) - D_{L1opt}(\theta, f)|^2 \right]}{\partial H_{L1}(f)}$$

Thus, there should be:

$$H_{L1}(f) = \left[ \int_\theta D_{L1opt} R(\theta, f)^* \right] \left[ \int_\theta R(\theta, f)^T R(\theta, f)^* \right]^{-1}$$

Wherein R(θ,f)* means R(θ,f) doing conjugate operation.
For Delay-And-Sum, the calculation is as follows:

$H_{L1}(f)=\exp\{jkd \cos(\theta_{L1})[p_1-p_0 p_2-p_0 \ldots p_M-p_0]\}$ $H_{L1}(f)$ is a vector quantity of M elements, and each element corresponds to a filter of loudspeaker unit. For the i-th loudspeaker unit, the corresponding filter is the i-th element in $H_{L1}(f)$.

The calculation of the filter group corresponding to the left sound beam 2, right sound beam 1, and right sound beam 2 is similar to $H_{L1}(f)$.

After above steps, the ideal filter group is obtained by calculation. The sound source signal is played via loudspeaker array after filtering. For each loudspeaker unit, the sound source of left channel is superposed after being filtered by the left sound beam filter group, and the sound source of right channel is superposed after being filtered by the right sound beam filter group, and then the sound is played via the loudspeaker unit after joint superposition.

Many current multimedia devices such as smart television, conference system, and the like possess camera and audio-video processing control chip, which can support complex operation, such as object recognition. And the camera and loudspeaker array of smart television are relatively fixed, camera generally at the center on the top of the television, while loudspeaker array at the bottom of the television. Therefore, the floor-wall corner of the room and the position of the user can be recognized from the images shot by the camera by using image recognition technology and automatic focusing technology. Then the position of the user in the room and the room information like room size and so on can be calculated by using the intrinsic parameters of the camera. According to the room information and user's position, the angle that the loudspeaker sound beam should direct at when achieving a better surrounding effect can be calculated, so that the user can hear the optimum surround sound effect. Wherein a better surround sound effect of an embodiment of the invention is: sound beam reaches the user after one reflection or two reflection on the wall.

Figure 12:
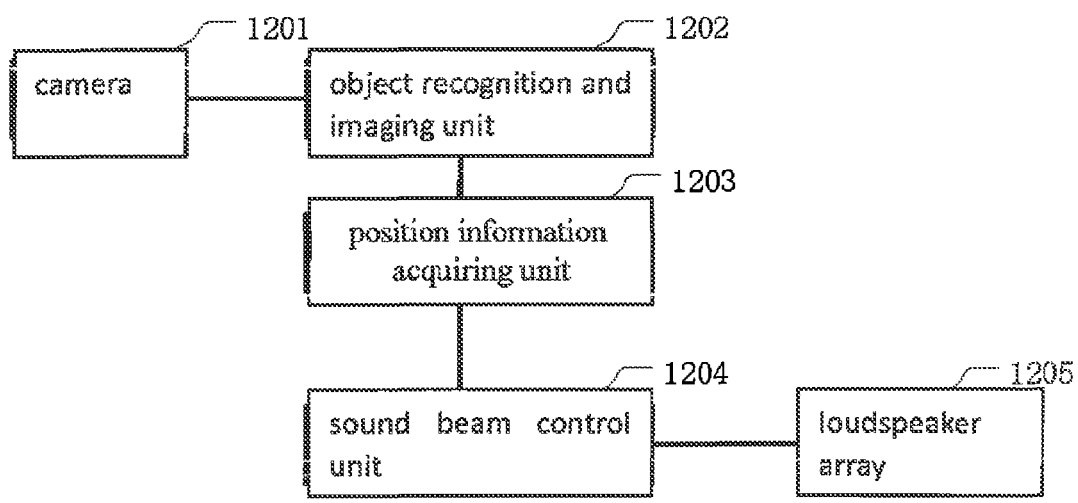
FIG. 12 is a flow chart of a system for achieving a self-adaptive surround sound of an embodiment of the invention.

FIG. 12 is a flow chart of a system for achieving a self-adaptive surround sound of an embodiment of the invention. As is shown in FIG. 12, the system comprises: a camera 1201, an object recognition and imaging unit 1202, a position information acquiring unit 1203, a sound beam control unit 1204, and a loudspeaker array 1205;

the camera 1201, for capturing images;

the object recognition and imaging unit 1202, for recognizing specific positions of a room and a user in the room by using an object recognition technology, controlling a camera to capture focusing images of recognized objects by using a focusing control technology, and recording corresponding focusing parameters;

the position information acquiring unit 1203, for calculating position information of the room relative to the camera and position information of the user relative to the camera according to the captured focusing images and the recorded corresponding focusing parameters;

the sound beam control unit 1204, for calculating paths of sound beams that can achieve the surround sound at the position of the user in said room according to the calculated position information of the room relative to the camera, position information of the user relative to the camera and the relative positional relation between the camera and the loudspeaker array; and determining parameters of a filter group of the loudspeaker array according to the calculated paths of sound beams, and adjusting the filter group of the loudspeaker array using the parameters;

the loudspeaker array 1205, for playing an audio signal after the audio signal is filtered by the filter group that has been adjusted according to the parameters to form surround sound at the position of the user in said room.

In an embodiment of the invention, the object recognition and imaging unit 1202 is for recognizing corner and floor-wall boundary by using the floor-wall boundary recognition technology, and controlling a camera to focus on the corners and floor-wall boundaries by using focusing control technology and capturing the focusing images of the corners and floor-wall boundaries; recognizing the user's face by using face recognition technology; and controlling the camera to focus on the user's face by using focusing control technology and capturing the focusing image of user's face. Specifically see the description in aforesaid section 1 "object recognition and focusing imaging".

Specifically, the object recognition and imaging unit 1202 recognizes the left corner, the right corner, the midpoint on the left floor-wall boundary, and the midpoint on the right floor-wall boundary by using the floor-wall boundary recognition technology, wherein the midpoints on the floor-wall boundaries are the midpoints on the part of the floor-wall boundaries that appear in the focusing images; and recognizes the user's face in the room by using face recognition technology; after the object is recognized, calculates the area where the object is located and drives the focusing motor according to the calculating result, so that the camera can be focused precisely on the recognized objects and form clear images.

In an embodiment of the invention, the focusing parameters recorded by the object recognition and imaging unit 1202 comprises: focal length and image distance for capturing focusing images;

The position information acquiring unit 1203 is specifically used for calculating the object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to the central axis of the camera lens, and calculating the equation of the left floor-wall boundary, equation of the right floor-wall boundary and equation of the opposite floor-wall boundary; and calculating the object distance of the user from the camera and angle of the user relative to the central axis of the camera lens.

Specifically, the position information acquiring unit 1203 is used for obtaining the object distance of the user from the camera according to the recorded focal length and image distance when the focusing image of the user's face is captured and on the basis of the conjugate imaging principle; determining the angle of the user relative to the central axis of the camera lens according to the position of the user's face in the focusing image, in combination with the visual angle parameter of the camera lens; similarly, obtaining the object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to the central axis of the camera lens, respectively; obtaining the equation of the left floor-wall boundary according to the coordinate information of the left corner and the midpoint on the left floor-wall boundary and based on the principle of two points defining a straight line; and obtaining the equation of the right floor-wall boundary according to the coordinate information of the right corner and the midpoint on the right floor-wall boundary and based on the principle of two points defining a straight line. Specifically see aforesaid Section 2.1 and Section 2.2.

In an embodiment of the invention, the sound beams that can achieve surround sound at the position of the user in the room calculated by said sound beam control unit 1204 refer to the sound beams reaching the position of the user after one reflection or two reflection on the wall, comprising:

the left sound beam 1: a sound beam that is pointed towards the left wall and is reflected once by the left wall, then reaching the position of the user;

the left sound beam 2: a sound beam that is pointed towards the left wall and is reflected once by the left wall, and then reflected once by the opposite wall, then reaching the position of the user;

the right sound beam 1: a sound beam that is pointed towards the right wall and is reflected once by the right wall, then reaching the position of the user;

the right sound beam 2: a sound beam that is pointed towards the right wall and is reflected once by the right wall, and then reflected once by the opposite wall, then reaching the position of the user.

The sound beam control unit 1204 is specifically used for converting the position information of the room relative to the camera and position information of the user relative to the camera into position information of the room relative to the loudspeaker array and position information of the user relative to the loudspeaker array according to the relative positional relation of camera and loudspeaker array; taking the position of the loudspeaker array as the zero point, first obtaining the mirror image point of the user relative to the left floor-wall boundary, and obtaining the equation of the left sound beam 1 according to the coordinates of zero point and the mirror image point and on the basis of the principle of two points defining a straight line; taking the position of the loudspeaker array as the zero point, obtaining the mirror image point 1 of the user relative to the opposite floor-wall boundary, then obtaining mirror image point 2 of the mirror image point 1 relative to the left floor-wall boundary according to the mirror image s point 1, and then obtaining the equation of the left sound beam 2 according to the coordinates of the zero point and the mirror image point 2 and on the basis of the principle of two points defining a straight line; similarly, obtaining the equations of the right sound beam 1 and right sound beam 2. Specifically see relevant description in aforesaid Section 3.1.

The sound beam control unit 1204 is further used for making the directions of the two sound beams on the corresponding side deflect certain angles from the user when the images of the left corner and/or the right corner cannot be captured; or, canceling the sound beam when any of the left sound beam 1, left sound beam 2, right sound beam 1 and right sound beam 2 is blocked by the user.

The sound beam control unit 1204 is used for determining parameters of filter group of the loudspeaker array according to the paths of the sound beams calculated by video processor and on the basis of Minimum Variance Distortionless Response or Delay-And-Sum. Specifically see relevant description in aforesaid Section 3.3.

The camera 1201 can be a passive focusing camera, an active focusing camera, or a camera with depth perception.

In summary, the technical scheme of the invention, by using object recognition and focusing control technology, captures focusing images of specific positions of a room and a user and records the focusing parameters, and then calculates position information of the room relative to a camera and position information of the user relative to the camera, and according to the information calculates sound beams that can achieve surround sound at the position of the user, and according to the calculated paths of the sound beams determines parameters of a filter group of the loudspeaker array, and adjusts the filter group, and plays the sound beams via the loud speaker array after the sound beams is filtered by the filter group, thus a self-adaptive surround sound is created at the position of the user in the objected room. This method does not need manual calibration and, for existing multimedia devices, does not need an additional hardware and can be free from an additional acoustic calibrating process, automatically calculating the orienting angle of sound beams of the loudspeaker array most suitable for the user, so that the user can experience abundant surround sound effect; when the user moves to a new position, it can self-adaptively achieve a surround sound at the new position. The technical scheme of the invention does not need additional acoustic calibration. The device is simple and convenient to use, without limiting the user's position and listening habit. It overcomes the problem of the prior technology that using sound beam formation creates surround sound in the hall, so that the user can feel optimum surround sound effect.

The foregoing descriptions merely show preferred embodiments of the present invention, and are not intended to limit the protection scope of the present invention. Any modification, equivalent replacement and improvement made within the spirit and principle of the present invention shall fall into the protection scope of the present invention.

The invention claimed is:

1. A method for achieving a self-adaptive surround sound, wherein the method comprises:
   recognizing specific positions of a room and a user in the room by using an object recognition technology, capturing focusing images of recognized objects by controlling a camera using a focusing control technology, and recording corresponding focusing parameters, the specific positions of a room including a left corner, a right corner, a midpoint on a left floor-wall boundary, and a midpoint on a right floor-wall boundary, wherein the midpoints on the floor-wall boundaries are the midpoints on the part of the floor-wall boundaries that appear in the focusing images;
   calculating position information of the room relative to the camera and calculating position information of the user relative to the camera according to the captured focusing images and the recorded corresponding focusing parameters;
   calculating paths of sound beams that can achieve the surround sound at the position of the user in said room according to the calculated position information of the room relative to the camera and the position information of the user relative to the camera and the relative positional relation between the camera and a loudspeaker array;
   determining parameters of a filter group of the loudspeaker array according to the calculated paths of the sound beams, and adjusting the filter group of the loudspeaker array using the parameters;
   playing an audio signal via the loudspeaker array after the audio signal is filtered by said filter group that has been adjusted according to the parameters to form surround sound at the position of the user in said room;
   wherein the step of calculating position information of the room relative to the camera includes the additional steps of:
   calculating object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to a central axis of the camera lens; and
   calculating an equation of the left floor-wall boundary, an equation of the right floor-wall hound and an equation of an opposite floor-wall boundary.

2. The method according to claim 1, wherein said recognizing specific positions of a room and a user in the room by using an object recognition technology, capturing focusing images of recognized objects by controlling a camera using a focusing control technology comprises:
   recognizing the specific positions of a room by using a floor-wall boundary recognition technology; recognizing a user's face in the room by using a face recognition technology; after the objects are recognized, calculating the areas where the objects are located, and making the camera precisely focus on the recognized objects and form clear images according to the calculating result;
   said calculating position information of the user relative to the camera comprises: calculating an object distance of the user from the camera and an angle of the user relative to the central axis of the camera lens.

3. The method according to claim 2, wherein said making the camera precisely focus on the recognized objects and form clear images according to the calculating result comprises:
  driving a focusing motor to make the camera precisely focus on the recognized objects and form clear images according to the calculating result; or
  using light field reestablishment to make the camera precisely focus on the recognized objects and form clear images according to the calculating result.

4. The method according to claim 2, wherein said sound beams that can achieve surround sound at the position of the user in the room refer to sound beams reaching the position of said user after one reflection or two reflections by walls, comprising: a first left sound beam, a second left sound beam, a first right sound beam, and a second right sound beam, wherein:
  the first left sound beam is a sound beam that is pointed towards the left wall and is reflected once by the left wall, then reaches the position of the user;
  the second left sound beam is a sound beam that is pointed towards the left wall and is reflected once by the left wall, and then reflected once by the opposite wall, then reaches the position of the user;
  the first right sound beam is a sound beam that is pointed towards the right wall and is reflected once by the right wall, then reaches the position of the user;
  the second right sound beam is a sound beam that is pointed towards the right wall and is reflected once by the right wall, and then reflected once by the opposite wall, then reaches the position of the user.

5. The method according to claim 4, wherein said calculating paths of sound beams that can achieve the surround sound at the position of the user in said room according to the calculated position information of the room relative to the camera and the position information of the user relative to the camera and relative positional relation between the camera and a loudspeaker array comprises:
  converting the position information of the room relative to the camera and position information of the user relative to the camera into position information of the room relative to the loudspeaker array and position information of the user relative to the loudspeaker array according to the relative positional relation of the camera and the loudspeaker array;
  by taking the central position of the loudspeaker array as a zero point, first obtaining a mirror image point of the user relative to the left floor-wall boundary, and then obtaining an equation of the first left sound beam according to coordinates of the zero point and the mirror image point and on the basis of the principle of two points defining a straight line;
  by taking the central position of the loudspeaker array as a zero point, first obtaining a first mirror image point of the user relative to the opposite floor-wall boundary, and then obtaining a second mirror image point of the first mirror image point relative to the left floor-wall boundary according to the first mirror image point, and then obtaining an equation of the second left sound beam according to the coordinates of the zero point and the second mirror image point and on the basis of the principle of two points defining a straight line;
  similarly, obtaining equations of the first right sound beam and the second right sound beam.

6. The method according to claim 4, wherein the method further comprises:
  when the image of the left corner and/or the right corner cannot be captured, making directions of two sound beams on the corresponding side deflect certain angles from the user;
  or,
  when any of said the first left sound beam, the second left sound beam, the first right sound beam and the second right sound beam is blocked by the user, canceling the sound beam.

7. A system for achieving a self-adaptive surround sound, wherein the system comprises:
  a camera, an audio-video processing control chip, and a loudspeaker array;
  the camera configured to capture images;
  the audio-video processing control chip configured to recognize specific positions of a room and a user in the room by using an object recognition technology, capture focusing images of recognized objects by controlling the camera using a focusing control technology, and record corresponding focusing parameters; said specific positions of a room comprises a left corner, a right corner, a midpoint on a left floor-wall boundary, and a midpoint on a right floor-wall boundary, wherein the midpoints on floor-wall boundaries are the midpoints on the part of the floor-wall boundaries that appear in the focusing images;
  calculate position information of the room relative to the camera and position information of the user relative to the camera according the captured focusing images and the recorded corresponding focusing parameters; and
  calculate paths of sound beams that can achieve the surround sound at the position of the user in said room according to the calculated position information of the room relative to the camera, the position information of the user relative to the camera and the relative positional relation between the camera and the loudspeaker array, and determine parameters of a filter group of the loudspeaker array according to the calculated paths of sound beams, and adjust the filter group of the loudspeaker array using the parameters;
  the loudspeaker array configured to play an audio signal after the audio signal is filtered by the filter group that has been adjusted according to the parameters to form surround sound at the position of the user in said room;
  said calculate position information of the room relative to the camera comprises: calculate object distances of the left corner, the right corner, the midpoint on the left floor-wall boundary, and the midpoint on the right floor-wall boundary from the camera and the angles of the left corner, the right corner, the midpoint on the left floor-wall boundary, and the midpoint on the right floor-wall boundary relative to the central axis of the camera lens, and calculate an equation of the left floor-wall boundary, an equation of the right floor-wall boundary and an equation of an opposite floor-wall boundary.

8. The system according to claim 7, wherein,
  said audio-video processing control chip is specifically configured to recognize said specific positions of a room by using a floor-wall boundary recognition technology; to recognize a user's face in the room by using a face recognition technology; calculate the areas where the objects are located after the objects are recognized, and make the camera precisely focus on the recognized objects and form clear images according to the calculating result; and calculate the object distance of the user from the camera and an angle of the user relative to the central axis of the camera lens.

9. The system according to claim 8, wherein said audio-video Processing control chip is specifically configured to drive a focusing motor to make the camera precisely focus on the recognized objects and form clear images according to the calculating result; or use light field reestablishment to make the camera precisely focus on the recognized objects and form clear images according to the calculating result.

10. The system according to claim 8, wherein, said sound beams that can achieve surround sound at the position of the user in the room refer to sound beams reaching the position of said user after one reflection or two reflections by walls, comprising: a first left sound beam, a second left sound beam, a first right sound beam, and a second right sound beam, wherein:

the first left sound beam is a sound beam that is pointed towards the left wall and is reflected once by the left wall, then reaches the position of the user;

the second left sound beam is a sound beam that is pointed towards the left wall and is reflected once by the left wall, and then reflected once by the opposite wall, then reaches the position of the user;

the first right sound beam is a sound beam that is pointed towards the right wall and is reflected once by the right wall, then reaches the position of the user;

the second right sound beam is a sound beam that is pointed towards the right wall and is reflected once by the right wall, and then reflected once by the opposite wall, then reaches, the position of the user;

correspondingly, said audio-video processing control chip is specifically configured to convert the position information of the room relative to the camera and position information of the user relative to the camera into position information of the room relative to the loudspeaker array and position information of the, user relative to the loudspeaker array according to the relative positional relation of the camera and the loudspeaker array; by taking the central position of the loudspeaker array as a zero point, first obtain the mirror image point of the user relative to the left floor-wall boundary, and then obtain an equation of the first left sound beam according to the coordinates of zero point and the mirror image point and on the basis of the principle of two points defining a straight line; by taking the central position of the loudspeaker array as a zero point, first obtain a first mirror image point of the user relative to the opposite floor-wall boundary, and then obtain a second mirror image point of the first mirror image point relative to the left floor-wall boundary according to the first mirror image point, and then obtain an equation of the second left sound beam according to the coordinates of the zero point and the second mirror image point and on the basis of the principle of two points defining a straight line; similarly, obtain equations of the first right sound beam and the second right sound beam.

11. The system according to claim 10, wherein said audio-video processing control chip is further configured to, when the images of the left corner and/or the right corner cannot be captured, making the directions of the two sound beams on the corresponding side deflect certain angles from the user; or, when any of the first left sound beam, the second left sound beam, the first right sound beam and the second right sound beam is blocked by the user, canceling the sound beam.

12. The system according to claim 7, wherein said the camera is a passive focusing camera, an active focusing camera, or a camera with depth perception.

* * * * *